US010604344B2

(12) United States Patent
Testa et al.

(10) Patent No.: US 10,604,344 B2
(45) Date of Patent: Mar. 31, 2020

(54) AUTOMATIC LOCKER DEVICE AND CORRESPONDING METHODS OF DISTRIBUTION AND INSERTION

(71) Applicant: SAVOYE, Dijon (FR)

(72) Inventors: Dominique Testa, Saint Priest en Jarez (FR); Anne Boudalier, Lille (FR); Erwan Godot, Levernois (FR)

(73) Assignee: SAVOYE, Dijon (FR)

( * ) Notice: Subject to any disclaimer, the term of this patent is extended or adjusted under 35 U.S.C. 154(b) by 0 days.

(21) Appl. No.: 15/905,088

(22) Filed: Feb. 26, 2018

(65) Prior Publication Data
US 2018/0244469 A1  Aug. 30, 2018

(30) Foreign Application Priority Data

Feb. 27, 2017  (FR) ...................................... 17 51575

(51) Int. Cl.
*B65G 1/06* (2006.01)
*B65G 1/04* (2006.01)
(Continued)

(52) U.S. Cl.
CPC ............. *B65G 1/06* (2013.01); *B65G 1/0407* (2013.01); *G06Q 10/0836* (2013.01);
(Continued)

(58) Field of Classification Search
CPC ....... A47B 63/067; G07F 11/165; B65G 1/06; B65G 1/04; B65G 1/0457
(Continued)

(56) References Cited

U.S. PATENT DOCUMENTS 4,966,513 A * 10/1990 Motoda ................... B65G 1/02
414/277
4,975,012 A * 12/1990 Motoda ................... B65G 1/04
414/609
(Continued)

FOREIGN PATENT DOCUMENTS

EP        0553470 A1    8/1993
GB        2143223 A     2/1985

OTHER PUBLICATIONS

French Search Report dated Oct. 11, 2017, for corresponding French Application No. 1751575, filed Feb. 27, 2017.
(Continued)

*Primary Examiner* — Timothy R Waggoner
(74) *Attorney, Agent, or Firm* — David D. Brush; Westman, Champlin & Kouhler P.A.

(57) ABSTRACT

An automatic locker device configured for a distribution of goods includes at least one storage area for the storage of loads including or formed by the goods, at least one retrieval point for the retrieval of the goods, and a handling device. The retrieval point includes a box having faces that are closed except for one open lateral face, having a first aperture oriented towards the exterior of the device, and an open lower face having a second aperture. The handling device is configured to shift one of the loads from the storage area towards the retrieval point and the vertically shift the load towards or through the second aperture of the open lower face, up to a height making it possible, through the first aperture of the open lateral face, to make available at least one of the goods included in or forming said load.

5 Claims, 9 Drawing Sheets

(51) Int. Cl.
*G07F 11/16* (2006.01)
*G06Q 10/08* (2012.01)
*G07F 11/62* (2006.01)

(52) U.S. Cl.
CPC ............ *G07F 11/165* (2013.01); *G07F 11/62* (2013.01); *B65G 2201/0285* (2013.01)

(58) Field of Classification Search
USPC ........................................................ 221/192
See application file for complete search history.

(56) References Cited

U.S. PATENT DOCUMENTS

| | | | | | |
|---|---|---|---|---|---|
| 5,074,496 | A | * | 12/1991 | Rezag | B64D 11/04 414/392 |
| 5,385,265 | A | * | 1/1995 | Schlamp | G07F 7/00 221/131 |
| 6,755,322 | B1 | * | 6/2004 | Herzog | B65G 1/06 221/123 |
| 2006/0045674 | A1 | * | 3/2006 | Craven | B65G 1/02 414/277 |
| 2008/0073373 | A1 | | 3/2008 | Vicentin | |
| 2011/0101837 | A1 | | 5/2011 | Solomon | |
| 2011/0226795 | A1 | | 9/2011 | Sichich | |
| 2013/0092702 | A1 | * | 4/2013 | Holmes | G07F 17/0092 221/191 |
| 2017/0073159 | A1 | * | 3/2017 | Lossov | G05B 19/124 |

OTHER PUBLICATIONS

English translation of the French Written Opinion dated Oct. 11, 2017, for corresponding French Application No. 1751575, filed Feb. 27, 2017.

* cited by examiner

AUTOMATIC LOCKER DEVICE AND CORRESPONDING METHODS OF DISTRIBUTION AND INSERTION

1. TECHNICAL FIELD

The invention relates to an automatic locker device (also called an automatic parcel distributor or parcel locker device). Such a device is configured for an automatic distribution of goods (parcels, envelopes, bags etc.) to users, and possibly for a preliminary automatic insertion of these goods by an operator.

The automatic locker device of the invention has many applications.

For example, it can be applied to the automatic distribution of goods for customers who have placed orders (for example through the Internet). In this case, it is part of the field of logistics and out-of-home delivery, especially in the context of B2C or BtoC e-commerce. Another term sometimes used in this context is "last-mile delivery".

According to another example, the invention can be applied to the automatic distribution of goods for employees within an establishment (a warehouse, a hospital etc.).

These examples of application are not exhaustive.

2. TECHNOLOGICAL BACKGROUND

We shall strive more particularly here below in this document to describe the problems and issues existing in the above-mentioned application of the automatic distribution of goods for customers who have placed orders (for example via the Internet). The invention is of course not limited to this special application but is of interest for any application that must cope with proximate or similar problems and issues.

The delivery of goods ordered online is a vital part of e-commerce. In France for example, in context of a surge in the growth of e-commerce, the French postal authority (known as the Groupe La Poste) is planning to deploy one thousand automatic locker systems for the collection or retrieval of parcels throughout French territory by the end of 2016. These will be located at hubs or very busy locations (such as railway stations, shopping centers or again vital points at the centers of densely populated cities).

Automatic locker systems are a novel solution for retrieval or collection of parcels, in addition to existing modes of delivery (home delivery, post office delivery or delivery at an exchange point hosted by a local business). This novel solution is simple, flexible in its use and entirely secured. Thus, a customer who has placed an order on the Internet and opts to have it delivered through an automatic locker receives for example a parcel retrieval code, by e-mail or by SMS when the parcel is available (i.e. when it has been deposited in the automatic locker system by a delivery person or carrier). All he must do then is to go to the automatic parcel locker system and type out the code on a man/machine interface (a keypad or a touchscreen for example) of the automatic parcel locker system to retrieve his parcel.

The advantage of the automatic parcel locker system is that it enables the Web user to retrieve his parcel 24/7. It also makes it possible to differentiate between the time when the item is deposited and its time of retrieval by the customer (separation in time). As in the case of the exchange point, each party makes half of the delivery and does so in a third location (spatial separation). The difference between this approach and the exchange point is that the process is automated and that there are no intermediaries.

In a first known automatic parcel locker technique, the delivery person places each of the parcels in one of the lockers of the automatic locker system. When the customer goes to the automatic locker system and types out his code on the keypad of the automatic locker system, the locker containing his parcel opens automatically.

One drawback of this first known automatic locker technique is related to the goods-loading operation (the loading of parcels for example). The delivery person has to load the different parcels in different lockers of the automatic locker system. There is therefore a need to facilitate the operation for loading goods into the automatic locker system and increase its speed.

Another drawback of this first known technique is related to the operation for retrieving goods (parcels for example). To retrieve his parcels, the customer must move before each of the lockers of the automatic locker system. Moreover, the lockers are placed at different heights which may make them inaccessible to certain customers or make them non-ergonomic (when the lockers are too high or too low). There is therefore a need to facilitate the operation for retrieving goods from the automatic parcel locker and increase the speed of this operation.

In the "PackRobot" (registered mark) solution by the Cleveron company, which is a second known technique, the automatic parcel locker device comprises an area for storing parcels on trays (eight storage columns each containing a plurality of storage cells), a retrieval point for retrieving parcels and handling means to move a tray (with the parcel that it carries) from the storage area to the retrieval point, or vice versa. More specifically, the handling means comprise a lift and a device for horizontal translation in a constant plane.

During a parcel-retrieval operation, the lift looks for a tray (with the parcel that it carries) in one of the storage cells and takes it to the height of the retrieval point. Then, the horizontal translation device takes the tray (with the parcel it is carrying) before an opening in the retrieval point (closed by a door except during the operation for handing over a parcel) thus enabling the user to take the parcel.

The lift and the horizontal translation device are also used for the reverse operation of inserting a parcel into the automatic locker device. In this case, the lift will look for an empty tray in one of the storage cells and take it to the height of the retrieval point. Then, the horizontal translation device takes the empty tray before an opening in the retrieval point, thus enabling the delivery person to place the parcel on the tray. Then, the horizontal translation device makes the tray move back (with the parcel that it is carrying) up to the lift. Finally, the lift places the tray (with the parcel that it is carrying) in one of the storage cells.

One drawback of this second known technique is that, during the insertion and retrieval operations, there is nothing that bars access to other parts of the machine (the automatic locker device) by the delivery person or the customer because of the above-mentioned horizontal translation movement. This second known technique therefore does not guarantee optimum security for the general user or the delivery person.

Another drawback of the second known technique is that it is specific to parcel-type goods that can be handled with trays, and is ill-suited to other types of goods such as those that have to be handled with containers (for example goods in bags or any other type of non-stable goods). Indeed, in the second known technique, the tray (with the parcel that it carries) is transferred towards the retrieval point in a horizontal translation motion along a constant plane, and the base of the parcel is thus always situated at the level of this plane (also called "pick-up level") for the user placed before the opening of the retrieval point. In fact, the above-mentioned plane in which the tray is shifted horizontally by the horizontal translation device is appreciably aligned vertically to the bottom of the opening of the retrieval point. In other words, the bottom of the parcel (situated on the tray) is appreciably at the level of the bottom of the opening of the retrieval point, thus enabling the user to take the parcel. To be able to place on the tray not a parcel (i.e. the item to be inserted or retrieved) directly but a container containing at least one item to be inserted or retrieved, the above-mentioned plane ("the pick-up level") should be positioned at a lower level so that the user (the delivery person respectively) is not hampered by the face of the container oriented towards him when he wishes to take (or insert respectively) the item into the container. However, such a "pick-up level", situated at a lower position, will not be adapted to the original use described above, namely the retrieval or insertion of the parcel. In short, the second known technique does not ensure a pick-up (retrieval) and loading (insertion) operation that is ergonomic regardless of the type of goods (parcel, envelope, bag etc.) and the height of these goods.

Yet another drawback of the second known technique is that it requires the implementation of supplementary automated movements by different devices (vertical movements by the lift and horizontal movements by the horizontal translation device). This increases the complexity of design and the risks of failure (entailing problems of reliability).

3. SUMMARY

One particular embodiment of the invention proposes an automatic locker device configured for a distribution of goods and comprising at least one area for the storage of loads comprising or formed by said goods, at least one retrieval point for the retrieval of said goods, and handling means configured to shift one of the loads from said at least one storage area to said at least one retrieval point. Said at least one retrieval point comprises a box having faces that are closed except for one open lateral face, comprising a first aperture oriented towards the exterior of said automatic locker device, and an open lower face comprising a second aperture. Said handling means are furthermore configured to vertically shift said load towards or through the second aperture of the open lower face, up to a height making it possible, through the first aperture of the open lateral face, to make available at least one of the goods comprised in or forming said load.

Thus, this particular embodiment of the invention relies on a wholly novel and inventive approach to an automatic locker device, with a retrieval point comprising a particular box co-operating with particular handling means. Indeed, the box is closed except for an open lateral face (for the external exchanges with the user) and an open lower face (for internal exchanges with the storage area). The handling means fulfil particular movements of the load relative to this box, in the event of goods being made available, and especially the vertical shifting of the loads towards or through the second aperture of the open lower face.

Thus, the solution has several advantages: especially but not exclusively:

it facilitates and increases the speed of the operation for retrieving goods from the automatic locker system (at least as compared with the first known technique);

it provides an optimal level of security for the general user (or the delivery person as explained further below) through the implementing of a retrieval box that bars access to other parts of the machine (the automatic locker device);

it is compatible with the retrieval of goods delivered as parcels, envelopes or bags;

it enables ergonomic functioning, compatible with any type of goods whatever the form in which these goods are delivered (parcels, envelopes, bags etc.), the height of these goods and the type of handling of these goods (with or without tray, with or without container etc.);

it is simple in design (it is therefore simple to install and costs little) and reliable.

According to one particular characteristic, said box has a cuboid shape having four lateral faces, one upper face and one lower face, and said closed faces comprise three of said four lateral faces and said upper face.

With this cuboid shape, the box is simple to make.

According to a first particular implementation, at least one first load among said loads comprises a tray and at least one of said goods, supported by said tray.

The proposed solution is therefore compatible with the first type of handling of the goods based on the use of a tray. This is for example suited to parcel type goods.

According to one particular characteristic, in the context of the first implementation mentioned here above, said handling means are configured to convey the bottom of said at least one item of goods supported by the tray to the bottom of the first aperture of the open lateral face.

Thus, whatever the height of the (at least one) item of goods, the user can easily grasp it.

According to a second particular implementation, at least one second load among said loads comprises a container and at least one of said items of goods, contained in said container.

The proposed solution is therefore compatible with a second type of handling of the goods based on the use of a container. This is adapted for example to a bag or envelope type of goods. In one particular implementation, the container is itself on a tray.

According to one particular characteristic, in the context of the above-mentioned second implementation, said handling means are configured to take the top of said container to the level of the bottom of the first aperture of the open lateral face.

Thus, whatever the height of the container, the user can easily grasp the (at least one) article or item of goods.

According to a third particular implementation, at least one third load among said loads constitutes one of said items of goods.

The proposed solution is therefore compatible with a third type of handling of the goods, without tray or container. In other words, the load is itself an item of goods. This is for example suited to a parcel type item of goods.

According to one particular characteristic, in the context of the above-mentioned third implementation, said handling means are configured to take the bottom of said at least one third load to the bottom of the first aperture of the open lateral face.

Thus, whatever the height of the (at least one) item of goods, the user can easily grasp it.

According to one particular characteristic, the handling means include a stacker crane type or mobile robot type device carrying out the following movements of said load: shifting from said at least one storage area to said at least one retrieval point and vertical shifting towards or through the second aperture of the open lower face.

This enables a simple and reliable design that does not require the implementation of complementary automated movements (contrary to the second known solution) because all the movements (including the vertical shift towards or through the second aperture of the open lower face) are carried out by the stacker crane or mobile robot type of device.

According to one particular characteristic, the automatic locker device comprises:

- a door, configured to close the first aperture of the open lateral face; and
- means of locking/unlocking said door, configured to unlock said door when said load is shifted vertically up to said height.

Thus, an optimal level of security is guaranteed, even outside times when a load is present in the box.

According to one particular characteristic, the automatic locker device is moreover configured for an insertion of incoming goods through said at least one retrieval point, and said handling means are moreover configured to:

- receive at least one of said incoming goods, through the first aperture of the open lateral face, and form an incoming load comprising or formed by said at least one piece of incoming goods;
- vertically shift said incoming load from or through the second aperture of the open lower face; and
- shift said incoming load from said at least one retrieval point towards said at least one storage area.

Thus, the proposed solution provides the above-mentioned advantages also in the context of the operation for loading goods into the automatic locker device.

Another embodiment of the invention proposes a method for distributing at least one outgoing item of goods stored in an automatic locker device according to any one of the above-mentioned embodiments, said method comprising the following steps performed by the handing means:

- shifting, from said at least one storage area to said at least one retrieval point, of a load comprising or formed by said at least one outgoing item of goods; and
- vertical shifting of said load towards or through the second aperture of the open lower face up to a height enabling said at least one outgoing item of goods to be made available through the first aperture of said open lateral face.

Another embodiment of the invention proposes a method for inserting at least one incoming item of goods in an automatic locker device according to any one of the above-mentioned embodiments, said method comprising the following steps performed by the handling means:

- receiving said at least one incoming item of goods through the first aperture of the open lateral face and forming an incoming load comprising or formed by said at least one incoming item of goods;
- vertically shifting of said incoming load, from or through the second aperture of the open lower face; and
- shifting said incoming load from said at least one retrieval point towards said at least one storage area.

4. LIST OF FIGURES

Other characteristics and advantages of the invention shall appear more clearly from the following description given by way of a non-exhaustive indicatory example and from the appended drawings of which:

5. DETAILED DESCRIPTION

In all the figures of the present document, the identical elements and steps are designated by a same numerical reference.

Here below in the description, we consider by way of an illustratory example the above-mentioned application in which the automatic locker device is used to carry out an automatic distribution of goods to customers who have placed orders (for example via the Internet).

The present invention is of course not limited to this particular application.

Figure 1:
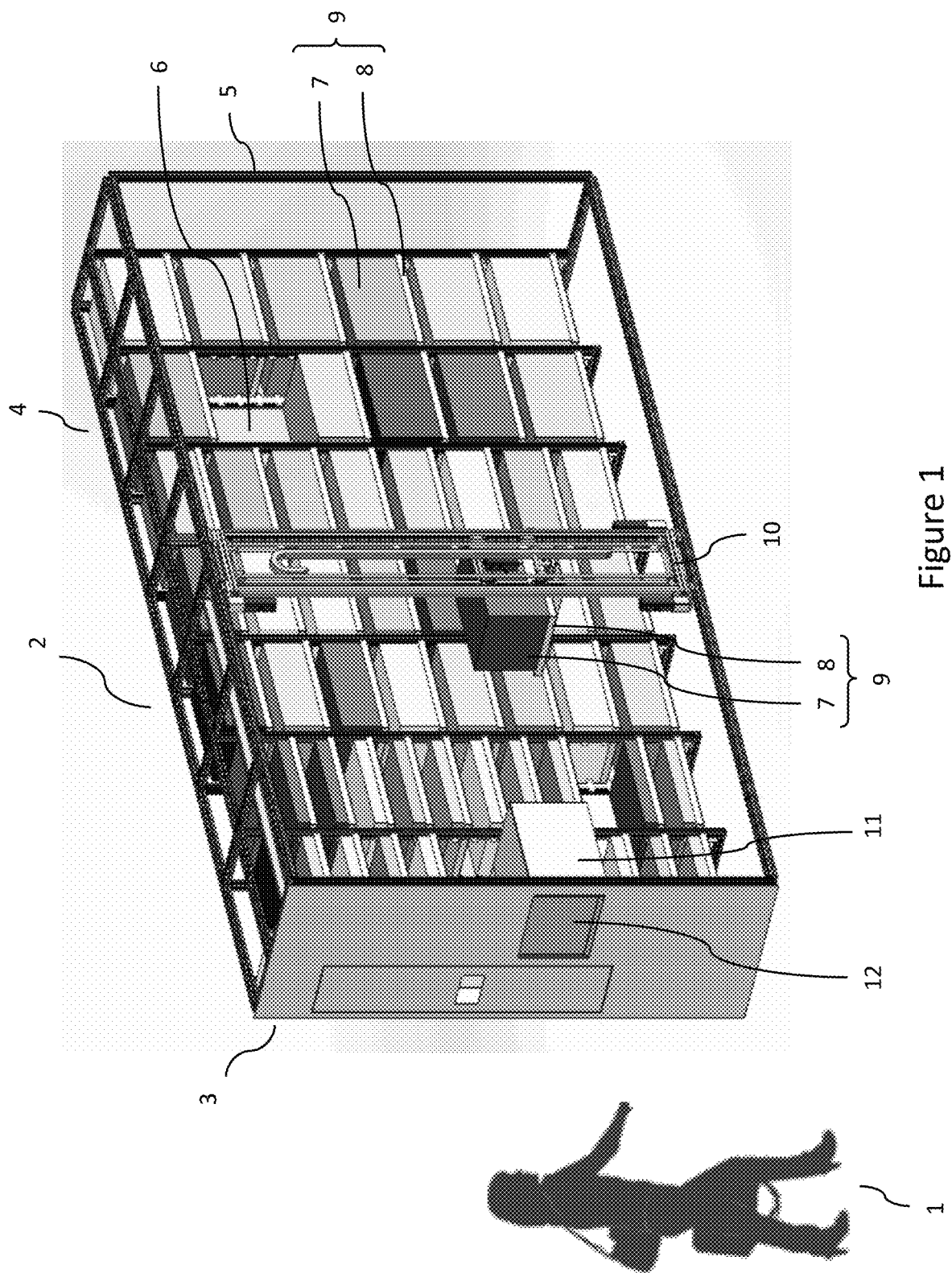
FIG. 1 is a perspective or a three-quarter view of an automatic locker device (2) according to one particular embodiment of the invention.

Referring to FIG. 1, we shall now describe an automatic locker device 2 according to one particular embodiment of the invention.

It is configured for a distribution of goods to customers or consumers 1 and comprises:

- (at least) one storage area 4 configured to store loads comprising or formed by goods;
- (at least) one retrieval point 3 configured to for the retrieval of goods by the users; and
- handling means 10 (for example a stacker crane mobile robot type device configured to shift one of the loads between the (at least one) storage area 4 and the (at least one) retrieval point 3.

The storage area 4 comprises for example a storage shelf 5 (also called a storage structure or shelving) with several columns.

Each column enables a storage of several superimposed loads 9, for example using plates (which may or may not be detachable) fixed to vertical uprights of the storage shelf 5. These plates define superimposed storage locations 6 (also called "storage cells"), each intended for receiving one load.

In the example of FIG. 1 (as in the example described further below with reference to FIGS. 3A to 3C), each load 9 comprises a tray 8 (forming a detachable plate in the above-mentioned sense) and at least one item of goods 7 (a parcel for example) supported by this tray.

The storage area 4 can be adapted to physical layout and flow constraints and, depending on different cases, can be rectilinear (the case of FIG. 1), L-shaped, T-shaped or U-shaped or have any other shape. The storage area can also include several storage shelves.

The retrieval point 3 has a box 11 having closed faces except for:

- an open lateral face comprising a first aperture oriented towards the exterior of the automatic locker device, and
- an open lower face comprising a second aperture.

In the particular embodiment of FIG. 1, the box 11 possesses the shape of a cuboid having four lateral faces, one upper face and one lower face. The closed faces comprise three of the four lateral faces and the upper face. In other words, the two open faces are the lower face and the last of the four lateral faces.

In the particular embodiment of FIG. 1, the retrieval point 3 furthermore comprises a door 12 configured to close the first aperture of the open lateral face and locking/unlocking means for the door, configured to unlock this door when the load is raised up to a desired height (see description here below). The door 12 is for example of the guillotine door type with assisted (motor-driven) vertical opening, and locking/unlocking means comprising for example a motor used to vertically actuate the door and a circuit (for example a processor co-operating with a sensor) used to detect the vertical position of the load and command the motor to open the door when the load is raised up to the desired height.

The handling means 10 are configured to apply different motions to the loads, enabling the distribution of the outgoing goods and, in one particular embodiment, also the insertion of the incoming goods. The automatic locker device comprises a control module (or driving module) (not shown) that controls the handling means 10 so that they can carry out the desired actions described in detail here below. The control module can equally well be installed in a reprogrammable computation machine (for example a PC computer, a DSP processor, a microcontroller etc.) executing a program comprising a sequence of instructions or on a dedicated computation machine (for example a set of logic gates such as an FPGA or an ASIC or any other hardware module).

Figures 4, 5:
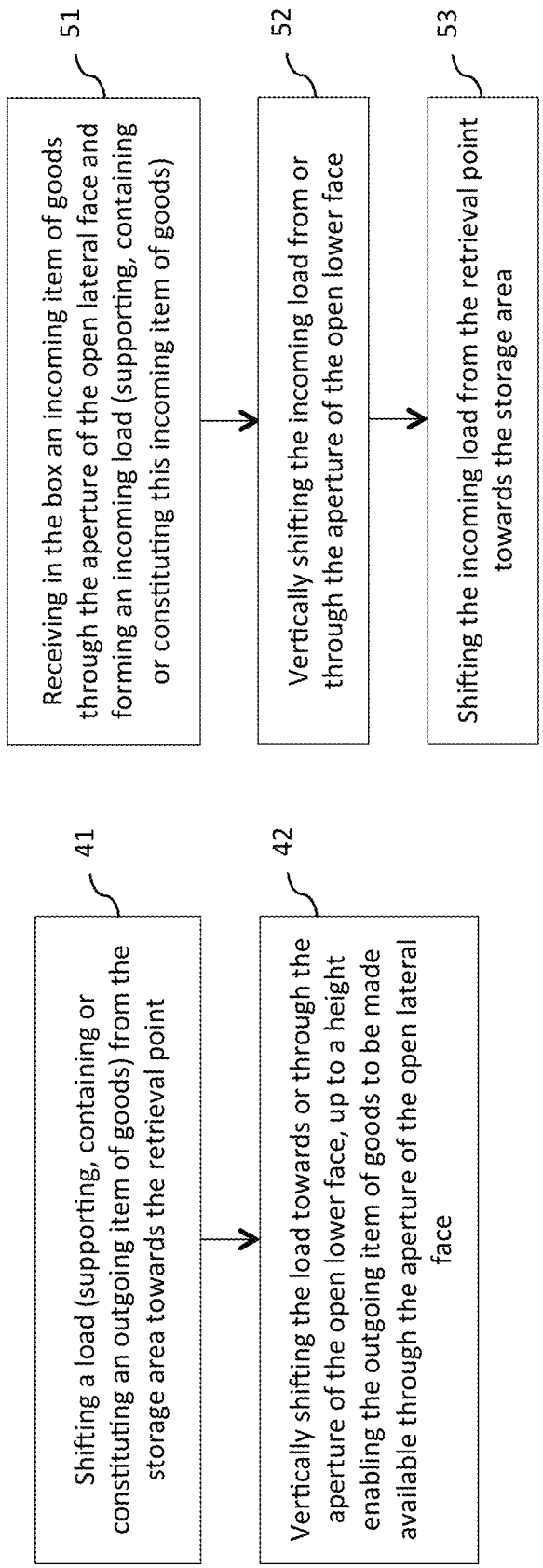
FIG. 4 is flowchart of a particular embodiment of the method for distributing an item of goods with the automatic locker device of FIG. 1.
FIG. 5 is a flowchart of a particular embodiment of the method for inserting goods with the automatic locker device of FIG. 1.

In one particular embodiment illustrated in FIG. 4, the method of distribution of (at least) one outgoing item of goods (carried out by the automatic locker device of FIG. 1) comprises the following steps carried out by the handling means 10:

shifting (41) from the storage area 4 to the retrieval point 3 of a load supporting, comprising or formed by the outgoing piece of goods;

vertical shifting (42) of the load towards or through the second aperture of the open lower face up to a height enabling the outgoing item of goods to be made available through the first aperture of the open lateral face. The load is therefore mounted at the right height to carry out an ergonomic pick-up of the item of goods depending on the type of load and the height of the load.

In one particular embodiment, illustrated in FIG. 5, the method of insertion of the (at least) one incoming item of goods (carried out by the automatic locker device of FIG. 1) comprises the following steps carried out by the handling means 10:

receiving (51) the incoming piece of goods through the first aperture of the open lateral face and forming (51) an incoming load comprising or formed by the incoming goods;

vertically shifting (52) the incoming load from or through the second aperture of the open lower face; and shifting (53) the incoming load from the retrieval point 3 towards the storage area 4.

Figure 2A:
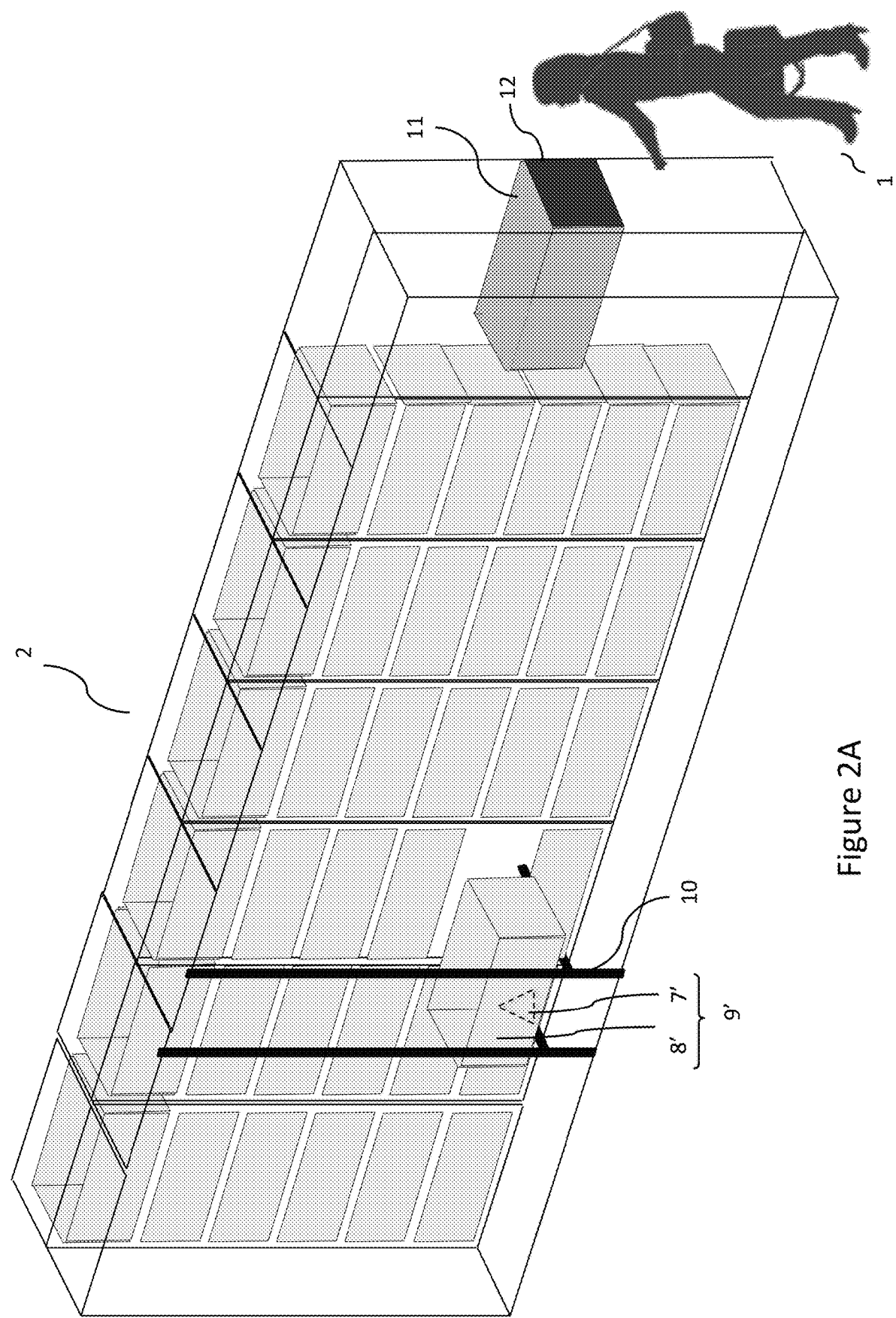
FIGS. 2A to 2D illustrate different stages of a first type of operation of distribution implemented by the automatic locker device of FIG. 1 with a load (9') comprising at least one item of goods (7') contained in a container (8')
Figure 2B:
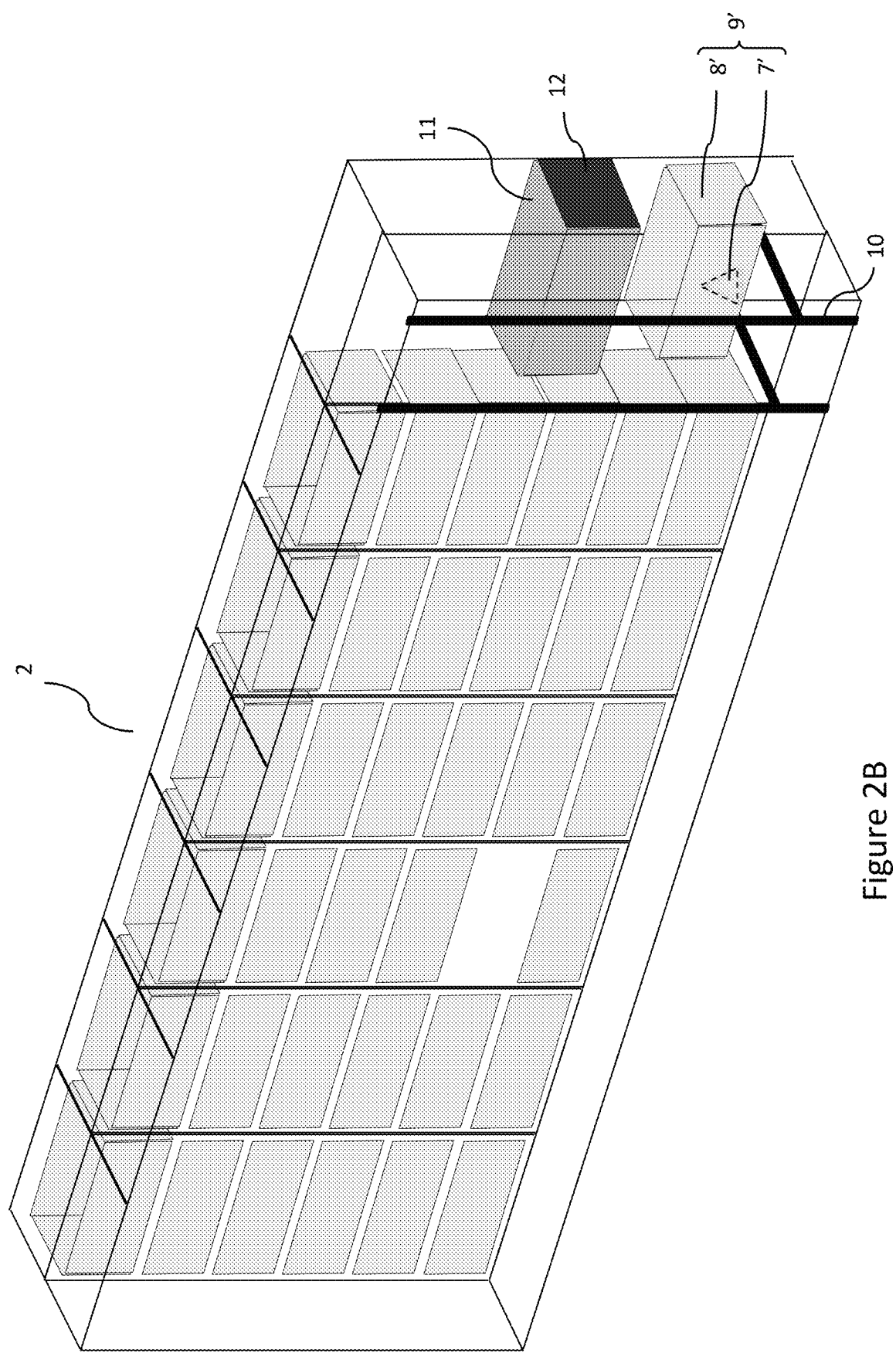
Figure 2C:
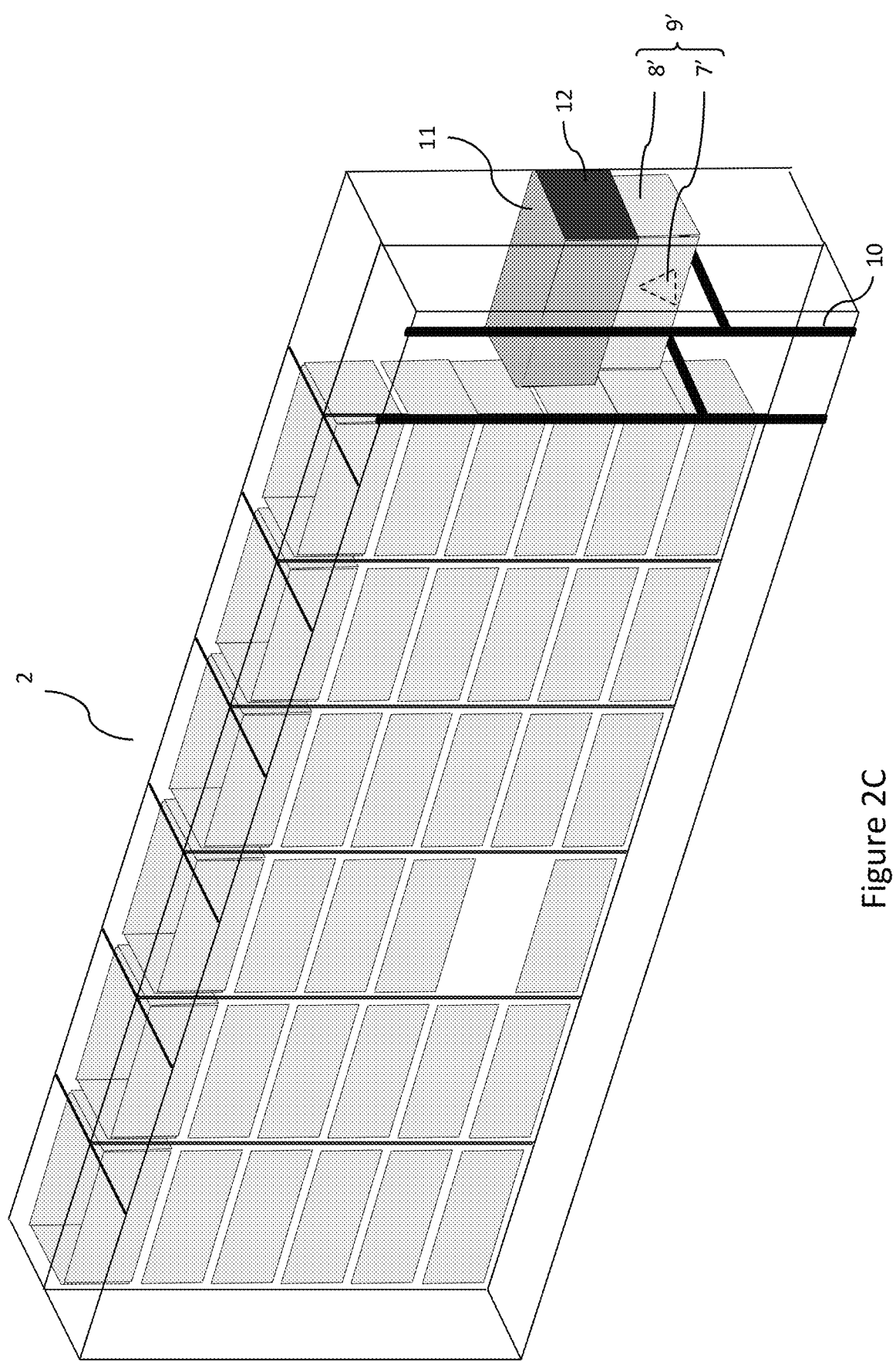
Figure 2D:
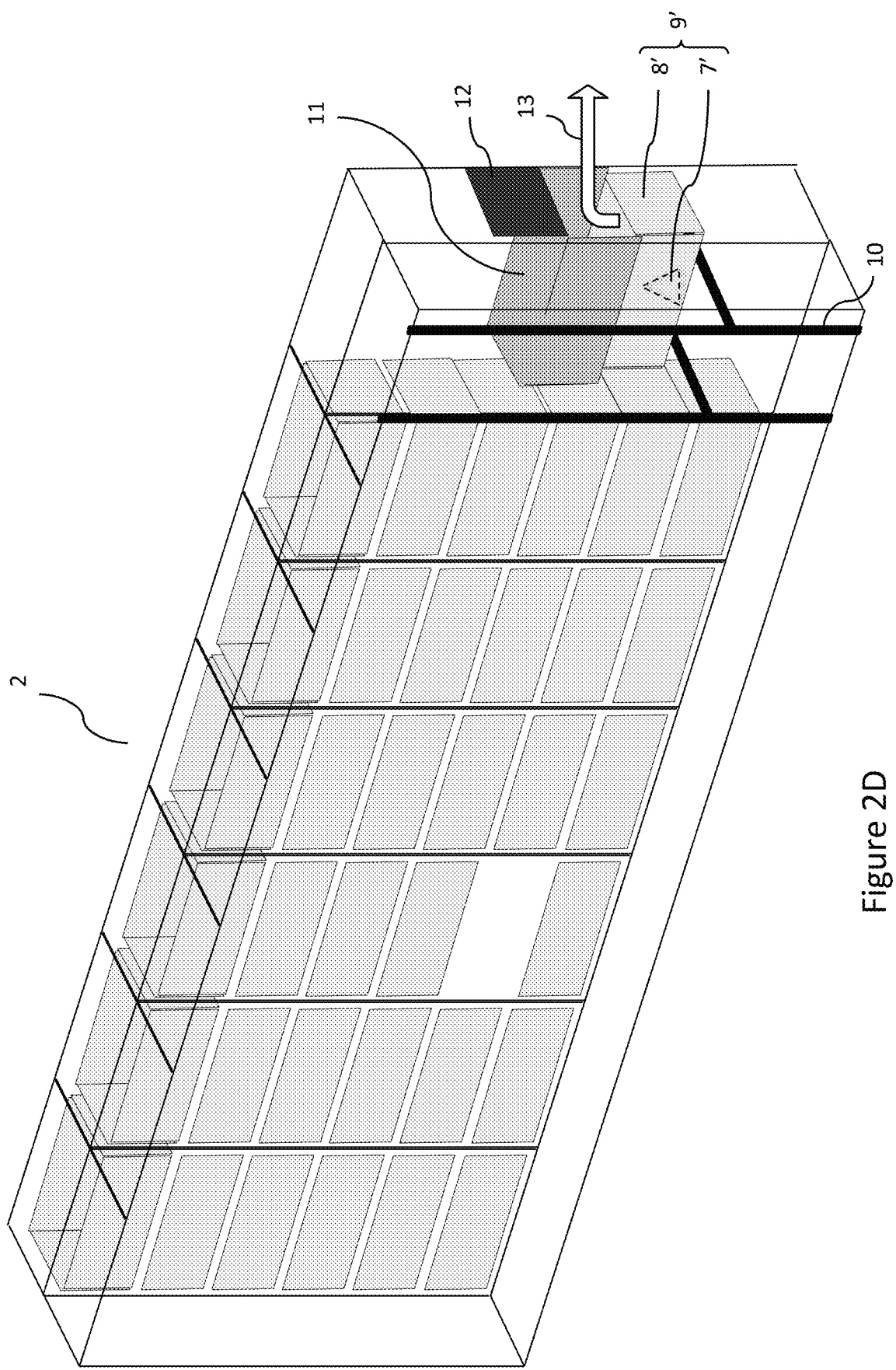

Referring now to FIGS. 2A to 2D, we present different stages of a first type of operation of distribution implemented by the automatic locker device of FIG. 1, with a load 9' comprising (at least) one item of goods 7' (for example a bag or any other type of non-stable goods) contained in a container 8'. In FIG. 2A, the handling means 10 take up the load 9' in the storage area 4. In FIG. 2B, the handling means 10 have conveyed the load 9' into the retrieval point and the load 9' is situated beneath the box (or more specifically beneath the second aperture of the open lower face). In FIG. 2C, the handling means 10 have shifted the load 9' vertically towards the second aperture of the open lower face of the box 11 up to the desired height. In this case, the top of the container 8' is conveyed to the level of the bottom of the first aperture of the open lateral face. In FIG. 2D, the door 12 is in an open position (it therefore does not close the first opening of the open lateral face) enabling the goods (bag) 7' to be taken from the container 8' by the user (as illustrated by the arrow 13).

Figure 3A:
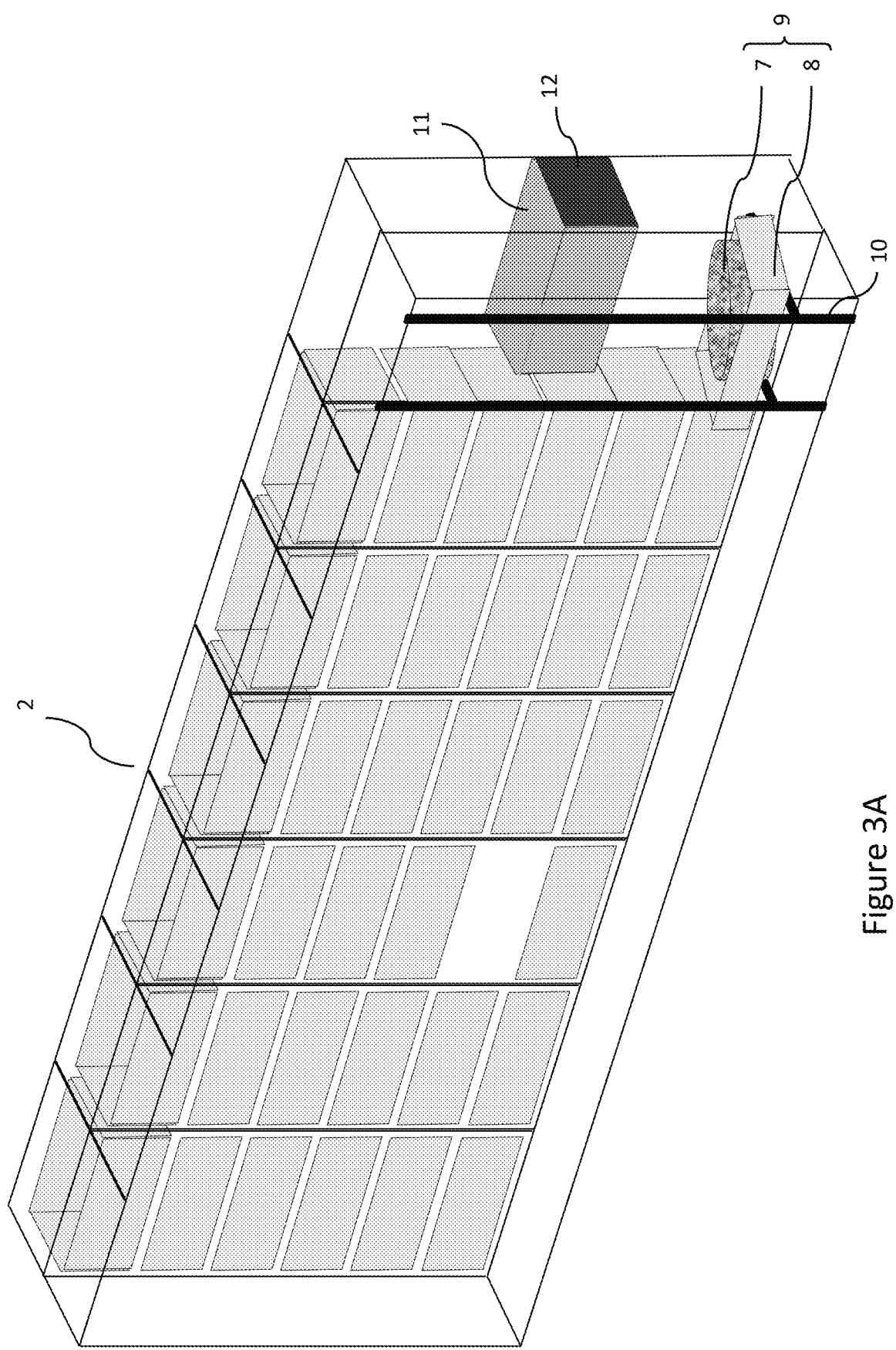
FIGS. 3A to 3C illustrate different stages of a second type of distributing operation implemented by the automatic locker device of FIG. 1, with a load (9) comprising an item of goods (7) supported by a tray (8)
Figure 3B:
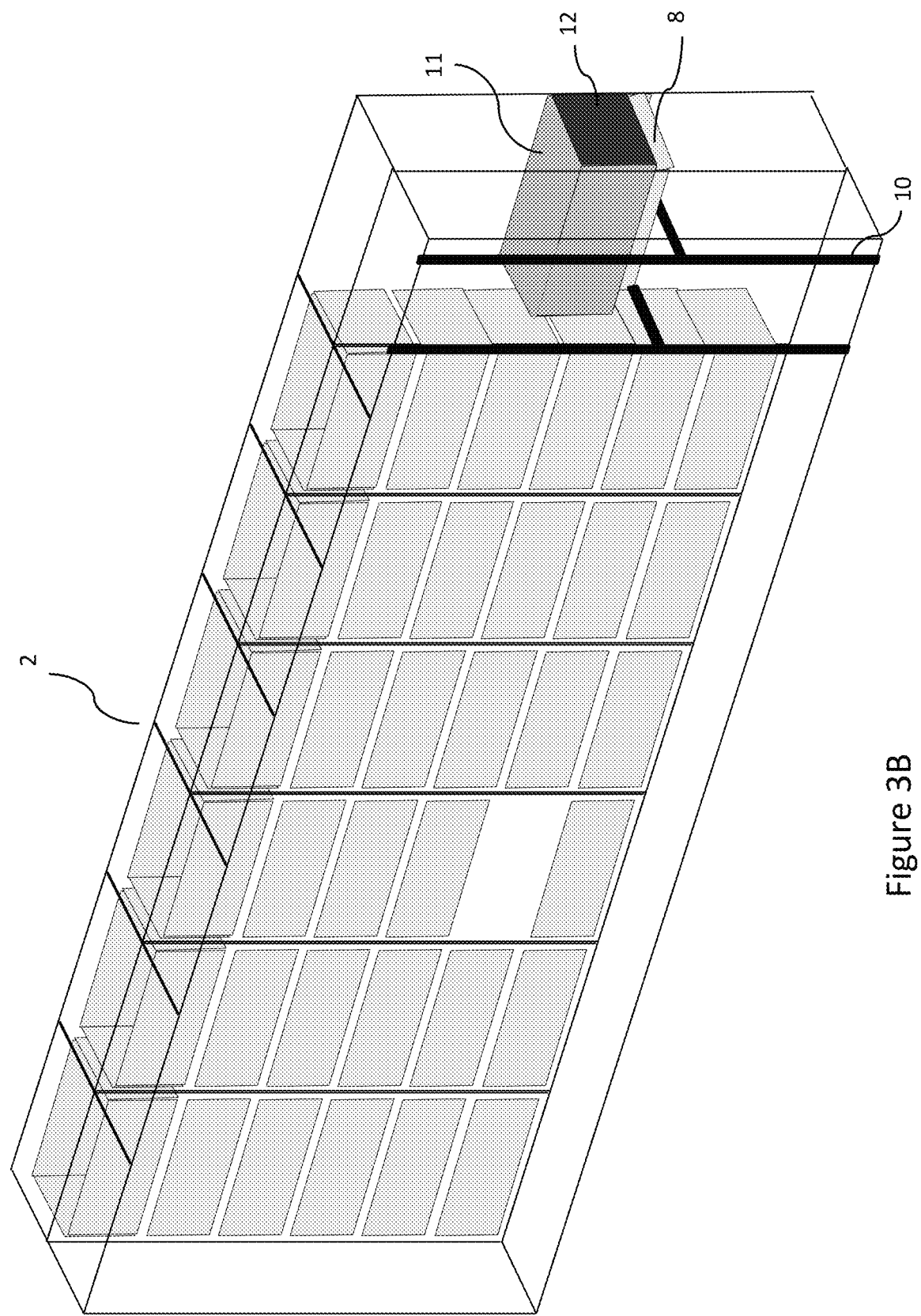
Figure 3C:
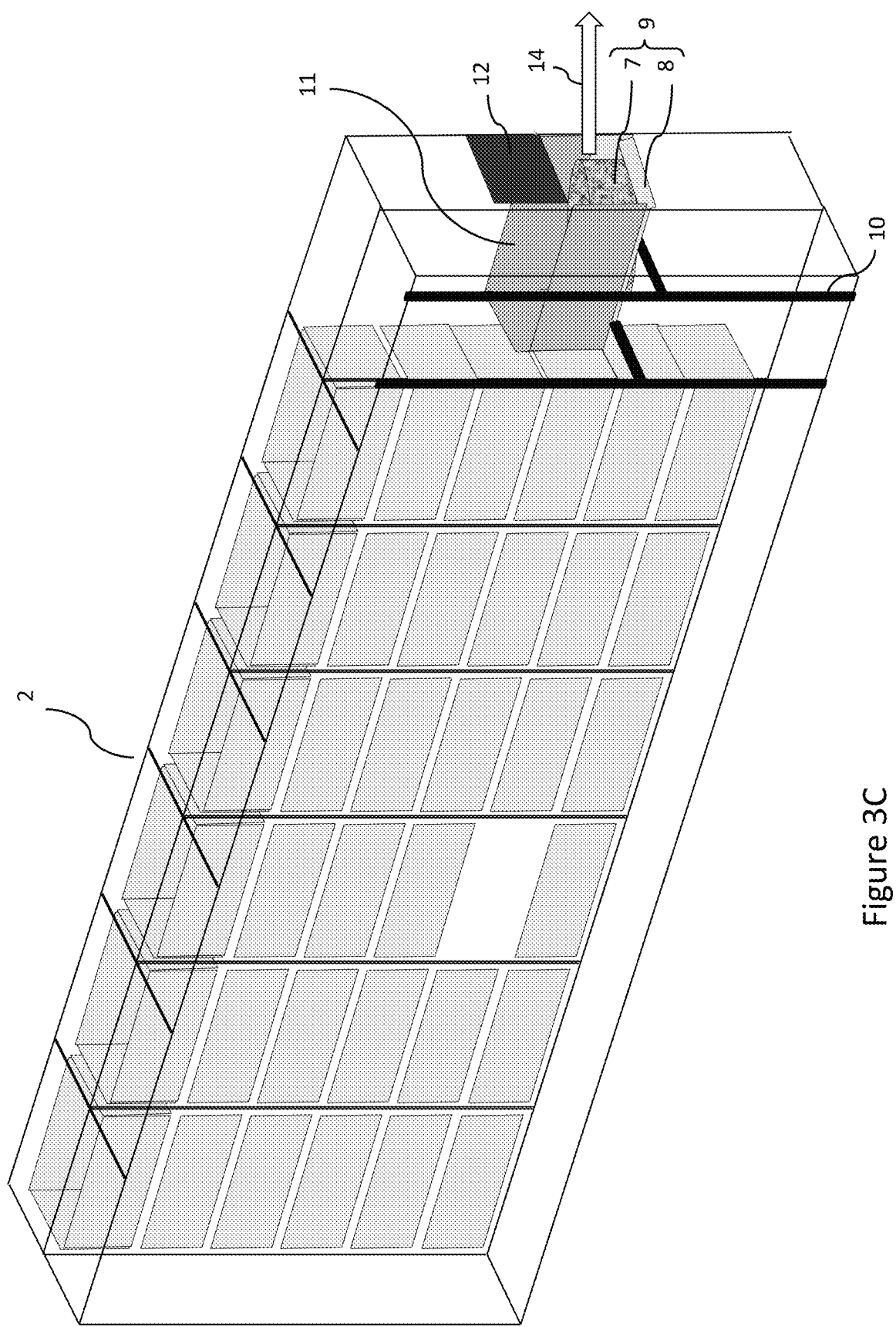

Referring now to FIGS. 3A to 3C, different stages are presented of a second type of distribution operation implemented by the automatic locker device of FIG. 1, with a load 9 comprising (at least) one piece of goods 7 (for example a parcel) carried by a tray 8. In FIG. 3A, the handling steps 10 have conveyed the load 9 from the storage area 4 up to the retrieval point and the load 9 is beneath the box (and more specifically beneath the second aperture of the open lower face). In FIG. 3B, the handling means 10 have shifted the load 9' vertically through the second aperture of the lower open face of the box 11 up to the desired height. As it happens, the bottom of the item of goods 7 (carried by the tray 8) is conveyed to the bottom of the first aperture of the open lateral face. In FIG. 3C, the door 12 is in an open position (it therefore no longer closes the first opening of the open lateral face), enabling the user to take the item (parcel) 7 on the tray 8 (as illustrated by the arrow 14).

Other types of distribution operations are possible, while remaining within the framework of the present invention. For example, in a third type of operation, the load is one of the items of goods. In other words, the item of goods (for example a parcel) is directly shifted by the handling means 10 without a tray or container. In this case, the handling means 10 are configured to shift the load vertically through the second aperture of the open lower face of the box 11 up to the desired height. In this case, the bottom of the item of goods is conveyed to the level of the bottom of the first aperture of the open lateral face.

Many other embodiments of the invention can be envisaged. It is possible especially to plan to combine several types of the above-mentioned operations within one and the same automatic locker device. In other words, the handling means 10 are configured to shift:

trays carrying goods and/or containers containing goods and/or directly goods (with neither trays nor containers).

At least one embodiment of the present disclosure overcomes the different drawbacks of the prior art.

At least one embodiment provides an automatic locker device to facilitate and increase the speed of the operation for loading goods in the automatic consignment device.

At least one embodiment provides a an automatic locker device to facilitate the operation for retrieving goods from the automatic locker device and increase its speed.

At least one embodiment provides a simple-to-install and low-cost automatic locker device.

At least one embodiment provides an automatic locker device with functioning that is ergonomic and compatible with any type of goods, whatever the form in which it is delivered (parcel, envelope, bag etc.), whatever its height and whatever the type of its handling (with or without tray, with or without container etc.).

At least one embodiment provides an automatic locker device of simple and reliable design, the installation and maintenance of which are easy.

At least one embodiment provides a technique of this kind that provides an optimal level of security for the general user or the delivery person.

Although the present disclosure has been described with reference to one or more examples, workers skilled in the art will recognize that changes may be made in form and detail without departing from the scope of the disclosure and/or the appended claims.

The invention claimed is:

1. An automatic locker device configured for a distribution of goods, and comprising:
   at least one storage area for storage of loads comprising or formed by said goods;
   at least one retrieval point for retrieval of said goods; and
   a handling device configured to shift any one of the loads from said at least one storage area to said at least one retrieval point,
   wherein said at least one retrieval point comprises a box having a cuboid shape comprising:
      three closed lateral faces,
      one open lateral face, comprising a lateral aperture oriented towards the exterior of said automatic locker device,
      one closed upper face, and
      one open bottom face comprising a bottom aperture,
   and wherein said handling device is furthermore configured to carry out both of the following two types of operation to vertically shift a given load towards or through the bottom aperture of the open bottom face, up to a height making it possible, through the lateral aperture of the open lateral face, to make available at least one of the goods comprised in or forming said load;
   a first type of operation, shifting a first type of load comprising a tray and at least one item of said goods supported by said tray, and in which said handling device is configured to convey, when vertically shifting a load of said first type towards or through said bottom aperture, a bottom of said at least one item of said goods supported by the tray to a bottom of the lateral aperture of the open lateral face; and
   a second type of operation, shifting a second type of load comprising a container and at least one item of said goods contained in said container, and in which said handling device is configured to convey, when vertically shifting a load of said second type towards or through said bottom aperture, a top of said container to a level of a bottom of the lateral aperture of the open lateral face.

2. The automatic locker device according to claim 1, wherein said handling device is configured to carry out the following supplemental type of operation:
   a third type of operation, shifting a third type of load which is one of said items of goods, and in which said handling device is configured to convey, when vertically shifting a load of said third type towards or through said bottom aperture, a bottom of said load to a bottom of the lateral aperture of the open lateral face.

3. The automatic locker device according to claim 1, wherein the handling device comprises a stacker crane type or mobile robot type device carrying out the following movements of said load: shifting from said at least one storage area to said at least one retrieval point and vertical shifting towards or through the bottom aperture of the open bottom face.

4. The automatic locker device according to claim 1, which further comprises:
   a door, configured to close the lateral aperture of the open lateral face; and
   a locking/unlocking device, which locks and unlocks the door and is configured to unlock said door when said load is shifted vertically up to said height.

5. The automatic locker device according to claim 1 and moreover configured for an insertion of incoming goods through said at least one retrieval point, and wherein said handling device is moreover configured to:
   receive at least one of said incoming goods, through the lateral aperture of the open lateral face, and form an incoming load comprising or formed by said at least one piece of incoming goods;
   vertically shift said incoming load from or through the bottom aperture of the open bottom face; and
   shift said incoming load from said at least one retrieval point towards said at least one storage area.

* * * * *